April 28, 1970   J. A. MADRE   3,508,384
AUXILIARY MOWING APPARATUS AND CONTROL MOUNT THEREFOR
Filed June 19, 1967   2 Sheets-Sheet 1
FIG. 1
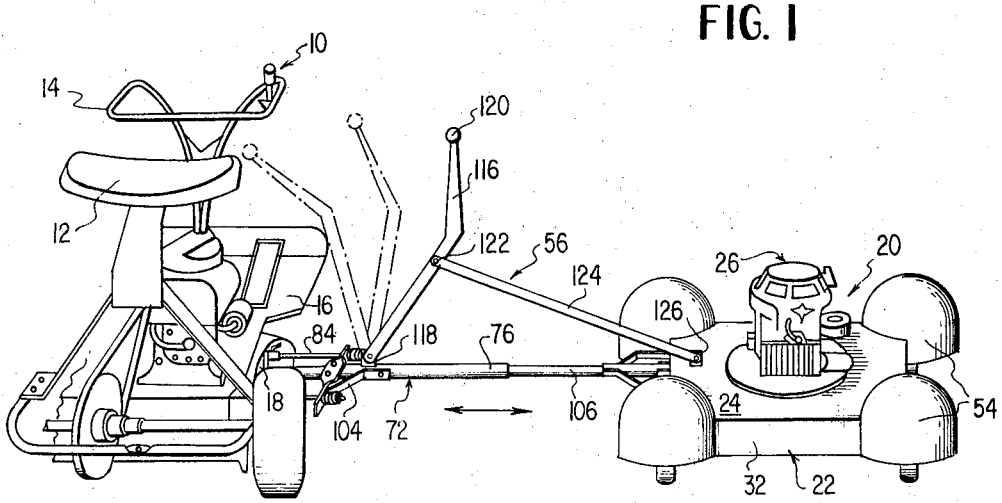
FIG. 2
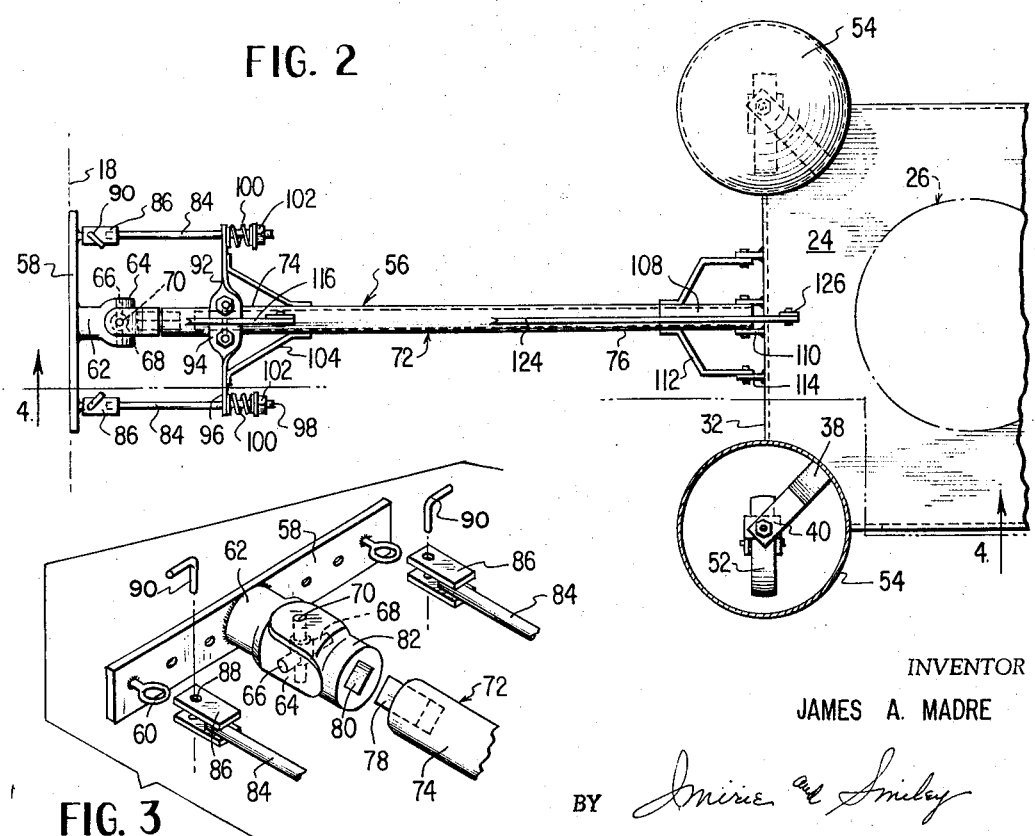
FIG. 3
INVENTOR
JAMES A. MADRE
BY *Minie and Smiley*
ATTORNEYS.

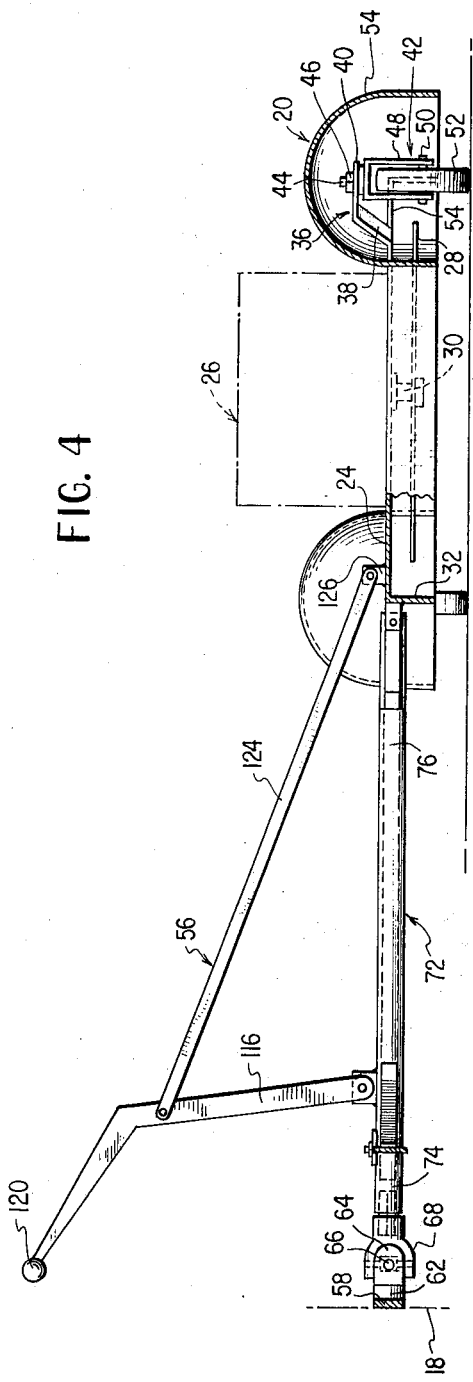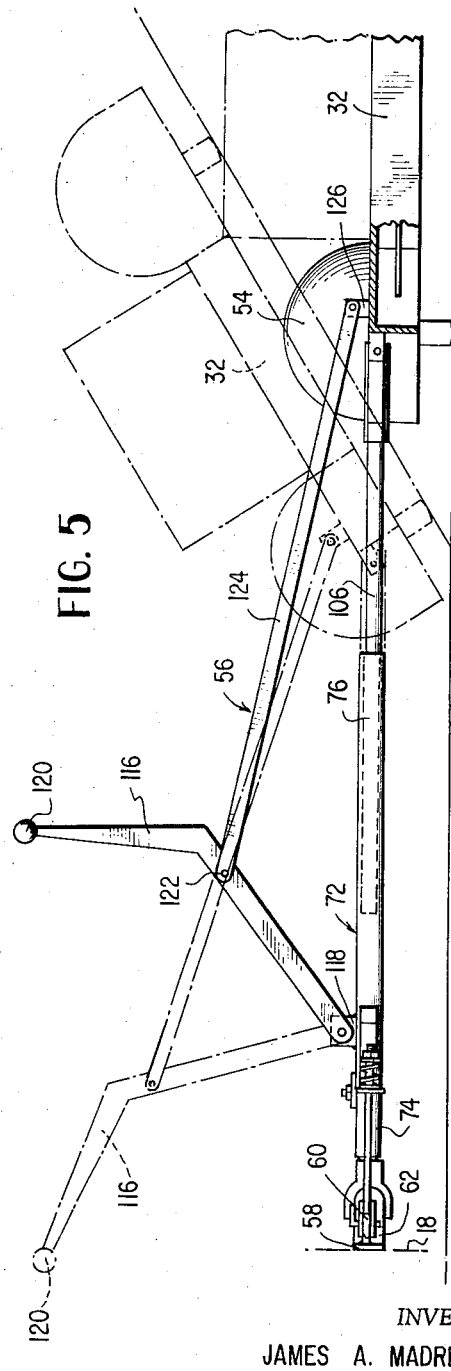

United States Patent Office 3,508,384
Patented Apr. 28, 1970

---

3,508,384
AUXILIARY MOWING APPARATUS AND CONTROL MOUNT THEREFOR
James A. Madre, Rte. 4, Box 452,
Elizabeth City, N.C. 27909
Filed June 19, 1967, Ser. No. 646,972
Int. Cl. A01d *35/26*
U.S. Cl. 56—25.4                                5 Claims

ABSTRACT OF THE DISCLOSURE

A control mounting assembly for the attachment of an auxiliary mowing apparatus on a powered main mower, the assembly being articulated for positioning at inclined operating angles, and an auxiliary mower having rotatable caster wheels.

BACKGROUND OF THE INVENTION

Field of the invention

This invention pertains to mowing apparatus of the self-contained variety wherein the main mower comprises a prime mover, and pertains further to the incorporation of an auxiliary mower therewith for movement with the main mower.

Description of the prior art

It has heretofore been proposed for the auxiliary mounting of mowers in towed or outboard relation to a main mower including a prime mover. Examples of prior patents in this field are as follows:

Gelinas, 2,658,320, Nov. 10, 1953; Musgrave, 2,779,-147, Jan. 29, 1957; Thornton-Trump, 2,877,618, Mar. 17, 1959; Maguire, 3,053,033, Sept. 11, 1962; Jolls, 3,274,-762, Sept. 27, 1966.

These prior proposals are chiefly concerned with increasing the swath or area of cut of the mowing operation and do not deal directly with angular adjustments of the auxiliary mower or with its adaptability to cutting under overhanging obstructions or around shrubs, buildings, and the like.

SUMMARY OF THE INVENTION

It is an important objective of the present invention to provide an auxiliary mower and control mount therefor which permits the disposition of the auxiliary mower at changeable angles of inclination whereby the auxiliary mower is adapted for mowing slopes and about obstructions without the necessity for driving the prime mover on the slope or near the obstruction.

A related advantage of the present invention concerns the incorporation of a control and linkage system between the main mower and an auxiliary mower, the control having a handle conveniently positioned for actuation by the operator of the prime mover.

Another important objective hereof is to provide a control mounting assembly for a mower wherein the mount includes a shock absorbing section reducing the likelihood of breakage or damage to the auxiliary mower or its support.

Still another objective of the invention relates to the provision of an outboard support element for an auxiliary mower, the support having telescoping members permitting the inclination of the auxiliary mower in a positive and secure position.

Another objective of the invention pertains to the provision of an auxiliary mower housing having a series of shielded caster wheels rotatable about vertical axes, thus permitting the auxiliary mower to be turned for maximum uses in difficult areas and the like without damage to the turf or to the components of the mower.

Other and further objects and advantages of the invention will become apparent to those skilled in the art from a consideration of the following specification, when read in conjunction with the annexed drawings.

BRIEF DESCRIPTION OF THE DRAWINGS

FIGURE 1 is a perspective view of a main mower having a control mounting assembly and an auxiliary mower constructed and assembled in accordance with the teachings of this invention in place thereon;

FIGURE 2 is a fragmentary, enlarged top plan view of the mount and the auxiliary mower;

FIGURE 3 is a dis-assembled perspective view showing details of a portion of the mount;

FIGURE 4 is an elevational view in cross section along the line 4—4 of FIGURE 2, looking in the direction of the arrows; and FIGURE 5 is another elevational view, partially broken away, and additionally showing the elements in an inclined operating position in phantom lines.

DESCRIPTION OF THE PREFERRED EMBODIMENT

In FIGURE 1 of the drawing reference numeral 10 generally designates a main mowing apparatus of the type often referred to as a riding mower. The mower 10 has an operator's seat 12, a steering and control handle 14 and a frame assembly 16 supporting a motor and blade. The frame 16 includes a frame side 18, and rides on ground wheels (not shown). It should be understood that the main mower is shown and described herein as one example only of a prime mover to which the present invention is applicable, and that other types and designs of mower are equally adapted to use herewith.

The auxiliary mower 20 of this invention comprises an auxiliary mower frame housing 22 having a top wall 24 on which is supported a motor 26 to power blade 28 suspended on the output shaft 30 below the wall 34. Four side walls 32 depend from the wall 24, and has spaced apart ends which define open corners, the top wall being indented, as at 34, at said corners.

A radially arranged bracket 36, comprising an upwardly inclined arm 38 and a horizontal outward section 40 is mounted to project from each of the indentations 34, to provide a wheel support at each of said corners. Each of the brackets supports a caster wheel assembly 42 comprising an upright axle 44 secured rotatably on the section 40 by a changeable fastener 46. A mount 48 of inverted U-shape and having a cross axle 50 for a ground wheel 52 is secured on each section 40. Thus, the wheels 52 are freely rotatable in a full 360 degree arc and turn to accommodate changes in the direction of movement of the mower. The wheels and their supporting brackets are preferably covered by a protective shroud 54 of suitable design.

The control mounting assembly hereof is generally identified in the drawing by reference numeral 56. The assembly is secured to the side frame 18 of the main mower by means of a plate 58 which is fixed thereto by suitable fastening means. The plate 58 is elongated and has eye bolts 60 fixed thereto adjacent its end portions. At its proximate mid-point a shank 62 is fixed to the plate 58, the shank having a clevis 64 at its outer end. A bolt 66 spans the arms of the clevis, and a second clevis 68 with a cross bolt 70 is mated with the first clevis, the cross bolts 66 and 70 being suitably pivoted at their mid-points (not shown) to permit pivotal motion between the first and second clevises in both a horizontal and vertical direction.

An elongated tubular element 72 comprises an initial section of an outward support for the auxiliary mower, and the tube 72 has an inclined end 74 and an outboard end 76. The end 74 is substantially solid and has a socket formed therein in which is mounted a connection lug 78. The lug 78 extends outwardly and is slidably received in a socket 80 in the shank 82 of the second clevis 68. This detail is best shown in FIGURE 3, wherein it is also to be observed that tie rods 84 are provided on either side of the tubular elements. The rods have plates 86 arranged in pairs at their inward ends, the plates also having co-aligned apertures 88 therein which are aligned over the openings in the eye bolts 60. Removable locking pins 90 are extended through these aligned openings to maintain the rods in place on the eye bolts. A collar 92 includes a central section 94 secured to the tubular element adjacent its end 74, the collar having side wings 96 with openings therein through which the outboard ends 98 of the rods 84 are extended. Springs 100 are compressed between the wings 96 and lock nuts 102, and angle braces 104 connect the wings to the tubular element. Thus, the collar braces and rods serve as a stabilizing means for the tubular element, but permits limited pivotal movement preventing breakage and minimizing wear at the connection of the rod to the main mower.

The outboard end 76 of the tubular element is open and the element has an enlarged bore therein extending outwardly a substantial distance. A substantially cylindrical rod 106 comprises an extendable and retractable portion of the support for the auxiliary mower, the rod being secured within the tubular bore and extending outwardly thereof. The rod 106 has an enlarged sleeve 108 fixed on its distal end, the sleeve being pivoted between connecting ears 110 on one side wall 32 of the auxiliary mower. An outward arm 112 extends to the wall 32 on each side of the sleeve and is pivotally secured to an ear 114.

As best shown in FIGURES 1 and 5 of the drawing, a control lever 116 is pivoted to the tubular element on an upstanding member 118. The lever has a handle section 120 located for convenient access from the driver's seat 12 of the prime mover and the lever is pivotally connected intermediate its ends at 122, to an elongated linkage member 124 which is, in time, pivotally connected to the top wall 24 of the auxiliary mower at a bracket 126.

In operation, when the unit is about soft terrain, the auxiliary mower is normally employed in the position shown in full lines in FIGURE 4 of the drawing. Should an overhanging obstruction be encountered, such as a large bush or tree, the auxiliary mower may be extended outwardly by pushing in the direction of extension on the lever 120 forcing the mower outwardly to the full line position of FIGURE 5. The device is further extremely useful where a slope adjacent flat ground is encountered. In such instance, the auxiliary mower may be tilted to the inclined position shown in FIGURE 5 in phantom lines, leaving the main riding section of the mower on flat ground which is considerably safer for the operator. The inclination of the auxiliary mower is accomplished by pulling inwardly on the lever 120 past the point of maximum inward retraction of the rod 106 with respect to the tubular element 74.

What I claim is:

1. The combination, with a main lawn mower of the riding variety which includes a riding frame with a frame side, of an auxiliary mower housing and a control mounting assembly therefor, comprising:
    (I) the auxiliary mower frame housing comprising:
        the housing including a housing top wall supporting a self-contained engine assembly;
        side wall assemblies depending from the top wall defining open corners;
        radially arranged brackets projecting outwardly from the top wall at each of said corners;
        caster wheel assemblies operatively secured to each of said brackets, the assemblies including ground wheels rotatable in a full 360 degree arc; and
    (II) the control mounting assembly comprising:
        a plate secured to the side of the main lawn mower frame;
        an elongated tube extending outwardly from the plate;
        a universal joint connection between the tube and the plate permitting pivotal movement of the tube with respect to the plate in both horizontal and vertical directions;
        a stabilizing assembly, including spring mounted rod means on opposite sides of the universal joint;
        a rod telescopically mounted in the tube and including a rod outer end;
        bracket means pivotally securing the rod outer end to one of the side wall assemblies of the auxiliary mower frame housing;
        a lever pivoted to the tube adjacent the main lawn mower, having a handle at its upper end; and
        a link pivoted to the lever intermediate its ends and to the top wall of the auxiliary mower frame to tilt the mower responsive to inward movement of the handle of the lever, the rod moving inwardly within the tube.

2. In combination, a main cutting machine including movable ground crop cutting means, an auxiliary cutting machine including movable ground crop cutting means, mounting means operatively connecting said auxiliary cutting machine with said main cutting machine, said mounting means including an extendable and retractable support means, pivot means connecting the outer end of said support means with said auxiliary cutting machine for pivotable movement therebetween about a pivot axis, and operating means connected with said support means for moving the outer end of said support means and said pivot axis toward and away from said main cutting machine to adjust the lateral position of said auxiliary cutting machine and to tilt selectively said auxiliary cutting machine about said axis.

3. Apparatus as defined in claim 2 comprising power means for driving both said cutting means and including a self-contained engine assembly supported by each of said main and auxiliary cutting machines.

4. Apparatus as defined in claim 2 wherein said operating means comprises a lever and link means pivotally connected between the respective end portions of said support means.

5. Apparatus as defined in claim 2 wherein said auxiliary cutting machine includes a mower housing, said housing comprising wall means substantially encasing the cutting section of said auxiliary cutting machine, a plurality of brackets mounted adjacent to said wall means at spaced apart locations, and caster wheel assemblies operatively secured of said brackets, the assemblies including ground wheels each rotatable in a full 360 degree arc, said brackets extending radially from said wall means and including a cover for each of said caster wheel assemblies.

References Cited
UNITED STATES PATENTS 2,982,565 5/1961 Lance _____ 280—484 XR
3,053,033 9/1962 Maguire _____ 56—6 XR ROBERT PESHOCK, Primary Examiner J. A. OLIFF, Assistant Examiner